United States Patent [19]

King, Sr.

[11] 4,328,847
[45] May 11, 1982

[54] UNIVERSAL WOODWORKING MACHINE

[76] Inventor: William K. King, Sr., 80 Schupp Rd., Hamden, Conn. 06514

[21] Appl. No.: 164,301

[22] Filed: Jun. 30, 1980

[51] Int. Cl.$^3$ .............................................. B27F 1/06
[52] U.S. Cl. .................................. 144/326 R; 144/86; 409/205; 409/217
[58] Field of Search .......... 144/1 R, 1 G, 2 R, 134 R, 144/134 A, 136 R, 323, 326 R, 286 R, 85, 87, 86; 409/201, 205, 216, 217, 218, 228, 206

[56] References Cited

U.S. PATENT DOCUMENTS

| | | | |
|---|---|---|---|
| 2,799,305 | 7/1957 | Groehn | 144/134 A |
| 3,209,800 | 10/1965 | Leibow | 144/134 R |
| 3,606,916 | 9/1971 | Day | 144/87 |
| 3,627,001 | 12/1971 | White | 144/87 |

Primary Examiner—W. D. Bray
Attorney, Agent, or Firm—Bachman and LaPointe

[57] ABSTRACT

A pair of routers are serially mounted on a pivotable support on a cutting table such that the routers may be adjusted in unison relative to the table. In addition the routers are adjustable relative to each other in a seesaw manner about a central cutting axis so as to maintain the axis. The apparatus and process of the present invention is particularly useful for making the male and female cuts of a dovetail joint in a single operation without requiring any adjustment of the routers relative to each other after the initial positioning. Depending on the cutting tool employed, dovetails, splines, rabbet cuts, mortise and tenon joints and countless other cuts may be made.

18 Claims, 8 Drawing Figures

UNIVERSAL WOODWORKING MACHINE

BACKGROUND OF THE INVENTION

The present invention is drawn to a woodworking machine and process for woodworking and more particularly a woodworking machine comprising a pair of serially spaced cutting tools mounted on a pivotable support on a cutting table wherein the cutting tools are adjustable both in unison with respect to the cutting table and relative to each other about a central cutting axis so as to maintain the axis.

Today, in the manufacture of cabinets or the like, the wood or workpiece used generally consists of a laminate material having prefinished surfaces. As a result of the prefinished surfaces it is undesirable to assemble the workpieces by nailing which would result in an unsightly finished product. Therefore, it would be highly desirable and of considerable advantage to be able to assemble furniture without the need of nails, screws, bolts and the like. This may be accomplished by making tongue and groove or dovetail joints, splines and the like for joining the workpieces together.

Heretofore in the woodworking art a single router was used in making both the male and female cuts in a dovetail joint. Traditionally the router was a hand held tool and as a result dimensional integrity was minimal thereby resulting in sloppy fitting joints.

One improvement over the hand held router was to securely mount the router in position on the cutting table. The male cut or tongue was then made by passing a workpiece through the cutter so as to form a slot on the lower surface of the workpiece and thereafter turn the workpiece over and again pass it through the cutter to form a slot on the other surface of the workpiece. Generally, while the joints formed had better dimensional integrity than those produced with a hand held router, the joints were not close fitting or did not fit at all due to the variance in thickness of the workpieces which is not uncommonly as great as an eighth of an inch.

One improved method and apparatus for making dovetail joints or the like is disclosed in U.S. Pat. No. 4,163,465 to Strong. The disclosure teaches mounting a router on a support plate which is adjustable in the vertical direction with respect to a base plate which supports a workpiece. In order to form a tongue in groove or dovetail joint a first workpiece is mounted on the base plate and the female cut or groove is formed by moving the workpiece into cutting engagement with a cutting tool so as to form a groove in the workpiece having a wide base dimension "B" narrowing to a narrow opening dimension "A". In order to make a matching male or tongue cut a second workpiece is mounted on the base plate and the cutting tool is lowered adjacent the base plate. The workpiece is then moved into cutting engagement with the cutting tool so as to cut a slot on the lower portion of the workpiece. The support plate and therefore the cutting tool is then raised a distance equal to dimension "A" plus dimension "B" and the workpiece is again moved into cutting engagement with the cutting tool so as to cut a second slot on the upper portion of the workpiece. The two slots cooperate to form the tongue or male part of the dovetail joint having a dimension "B" and a dimension "A" which slidingly fits in the female cut independent of the relative thicknesses of the various workpieces.

While the aforenoted U.S. Pat. No. 4,163,465 offers significant improvements over those woodworking apparatus previously known in the art, a number of problems have been encountered. It is highly desirable for economic advantages and increased productivity to limit both the number of tool adjustments which must be made to form the male and female parts of a dovetail joint and the number of passes by the workpiece to form said dovetail joint. While snugly fitting joints may be achieved by employing an apparatus such as that disclosed in U.S. Pat. No. 4,163,465 which utilizes a vertically adjustable router, such an apparatus requires multiple tool adjustments and a plurality of workpieces pass to form the male part of the dovetail joint thereby limiting productivity and correspondingly increasing the cost of the finished product.

U.S. Pat. No. 2,790,472 to Fata discloses an apparatus for making tapered dovetails wherein first and second cutters are provided for making the top and bottom cut of a male dovetail in a single cut. The workpiece is held in a pivotable work guide which is fed to the cutters. While the apparatus disclosed by Fata offers a number of advantages it still suffers from numerous serious and costly disadvantages. The first and most serious disadvantage is the fact that the machine is incapable of making both the male and female cuts in a single operation. The female cut is not capable of being made on the Fata apparatus. In addition, a second serious problem with the Fata apparatus is the inability of the machine to make both male and female cuts at any and all desired angles. Furthermore, the apparatus is incapable of making any cuts other than the male portion of a dovetail such as splines, rabbet cuts, mortise, chamfer or the like. Finally, the apparatus of U.S. Pat. No. 2,790,472 is extremely complex, costly to manufacture and susceptible to numerous mechanical malfunctions.

Accordingly, it is a principal object of the present invention to provide an apparatus and method which readily forms the male and female portion of a dovetail joint independent of the thickness of the workpiece without requiring multiple adjustments of the routers.

It is a particular object of the present invention to provide an apparatus having a pair of routers serially mounted on a pivotable support on a cutting table.

It is a further object of the present invention to provide an apparatus having a pair of routers which are readily adjustable both in unison with respect to a workpiece and relative to each other about the cutting axis.

It is a still further object of the present invention to provide an apparatus having a pair of routers mounted in a yoke arrangement and movable relative to each other in a seesaw manner.

It is another still further object of the present invention to provide an apparatus wherein the cutting tools are readily replaceable so that the apparatus is capable of making numerous types of cuts.

Further objects and advantages of the present invention will appear hereinbelow.

SUMMARY OF THE INVENTION

In accordance with the present invention the foregoing objects and advantages are readily obtained.

The present invention comprises a highly efficient woodworking process and apparatus for forming dovetail joints or the like comprising a pair of cutters arranged serially so as to cut in a single pass both the male and female portions of a dovetail joint. The cutters or routers are mounted on a support plate which in turn is pivotably mounted on a cutting table. The routers are mounted in a yoke assembly on the support plate, the yoke assembly being selectively adjusted so as to allow the routers to move in unison or relative to each other in a seesaw manner. The apparatus of the present invention allows for relative movement of the routers in the yoke assembly while at the same time maintaining the same central cutting axis.

By virtue of the process and apparatus of the present invention, the male and female portions of a dovetail joint may be made in a single pass without the necessity of making relative tool adjustments. The apparatus of the present invention allows for each router to cut the top and bottom slot respectively of the male portion in a single pass and likewise cut the female portion. At the same time the apparatus allows for consistent dimensionally accurate cuts irrespective of any variance in thickness of respective workpieces. By allowing the routers to pivot with respect to the cutting table joints may be readily made at all angles by merely pivoting the router support to the desired angle.

Thus, the apparatus of the present invention provides a highly efficient apparatus for forming dovetails and numerous other cuts which is characterized by simplicity of structure and ease of operation.

DETAILED DESCRIPTION

Figure 1:
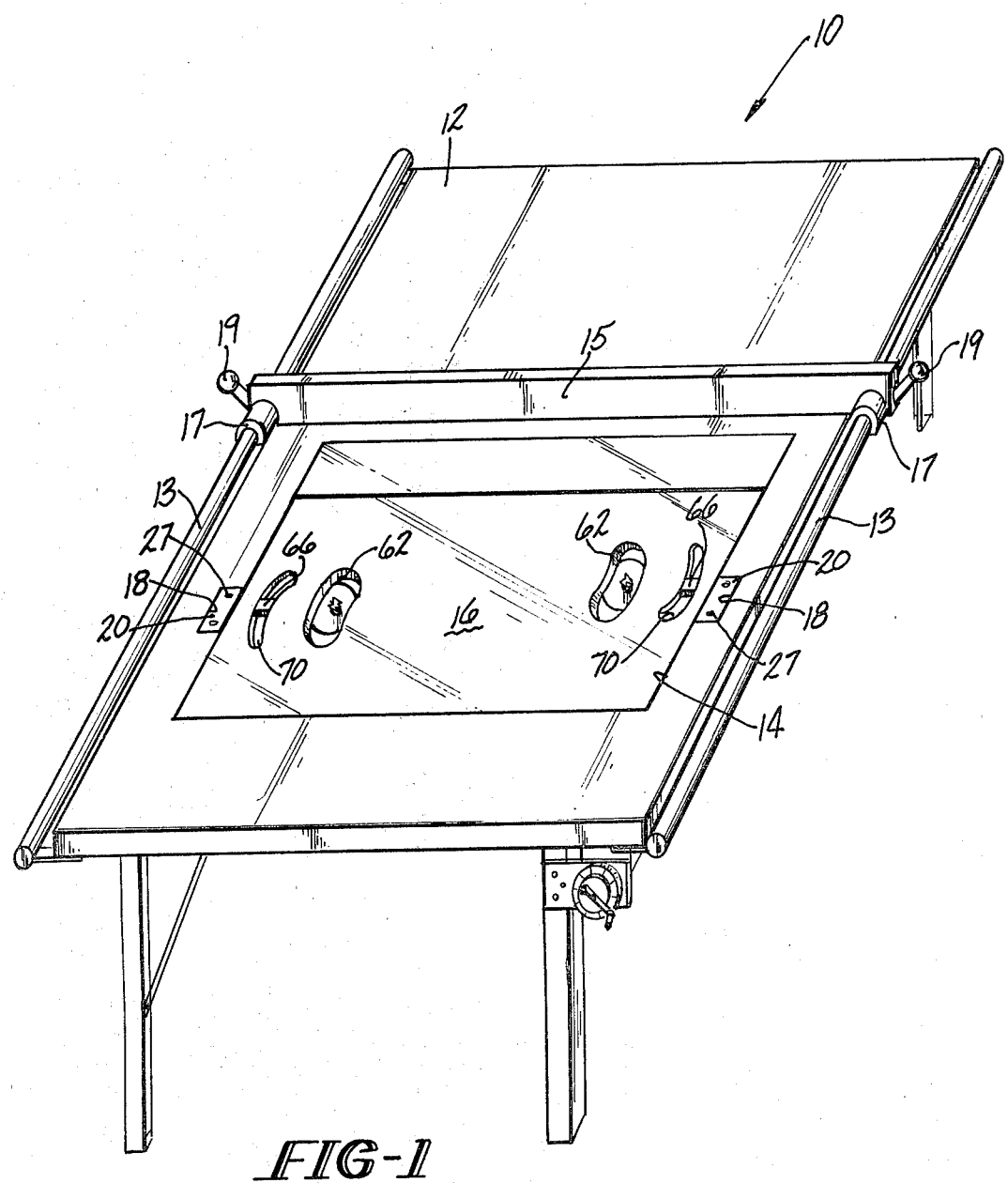
FIG. 1 is a perspective view of the apparatus of the present invention illustrating the pivotable support in its horizontal position.
Figure 3:
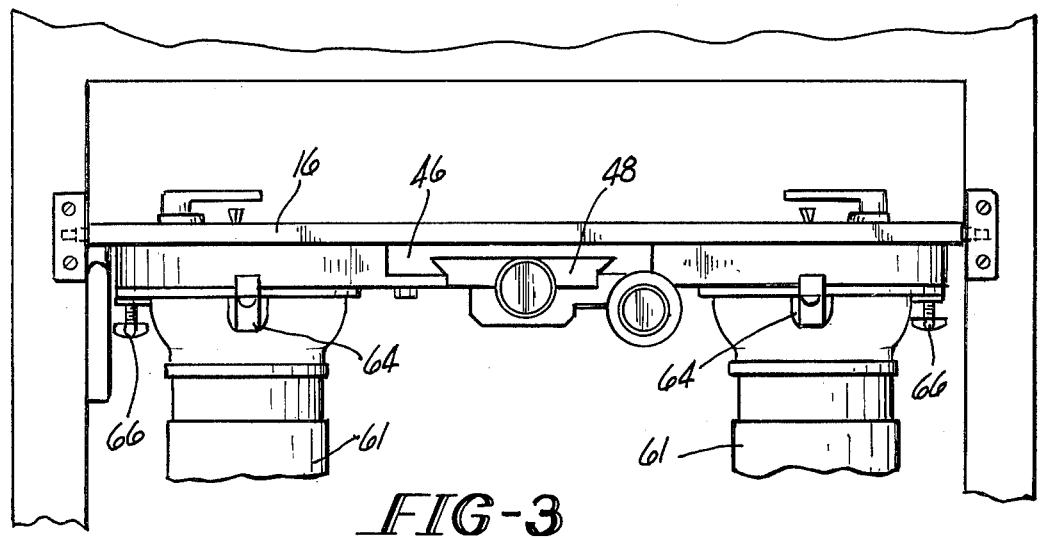
FIG. 3 is a top view of the embodiment of FIG. 2.
Figure 2:
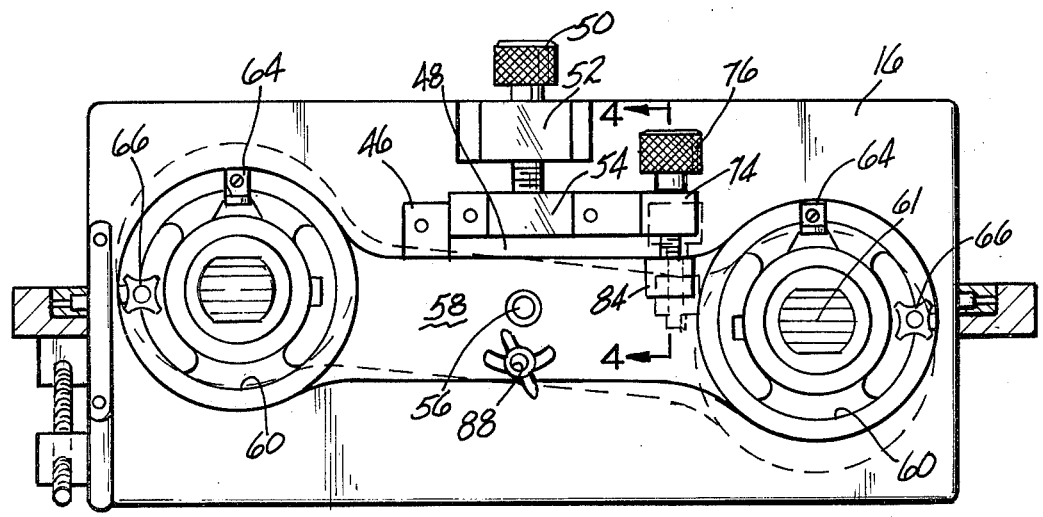
FIG. 2 is a back view of the pivotable support of the present invention illustrating the details of the yoke arrangement of the preferred embodiment.

While the present invention will be described and exemplified with reference to the machining of dovetails it will be appreciated that broader applications can be made in that depending on the cutting tool employed dovetails, splines, rabbet cuts, mortise, tenon joints and countless other cuts can be made.

With reference to the drawings, the apparatus 10 of the present invention comprises a table 12 provided with a pair of tubular guides 13 secured to either side thereof. A workpiece guide 15 having a pair of channels 17 is selectively adjustable on the guides 13 by means of clamps 19. The top of table 12 has a rectangular opening 14 in which a support plate 16 is pivotably mounted. The top of the table 12 is provided with a pair of opposed recesses 18 on either side of the rectangular opening 14 adapted to receive metal plates 20 each of which is provided with an oilite bearing 22 secured into a bore hole 24 in the plates 20 by means of press fit or the like. The support plate 16 is provided with a pair of cylindrical posts 26 which are received in the oilite bearings 22 in the plates 20. When assembling the support plate 16 to the table 12, the cylindrical posts 26 are positioned in the bearings 22 provided in metal plates 20 and the support plate 16 and metal plates 20 are positioned in rectangular opening 14 and recesses 18, respectively and secured in place on the table by means of bolts 27.

Figure 5:
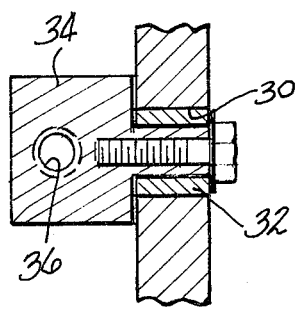
FIG. 5 illustrates the bearing connection for the drive mechanism which pivots the support plate.
Figure 4:
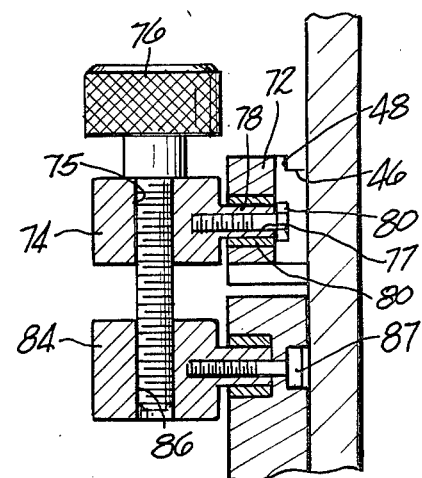
FIG. 4 is a sectional view taken along line 4—4 illustrating the mechanism for pivoting the yoke arrangement of the instant invention.
Figure 6:
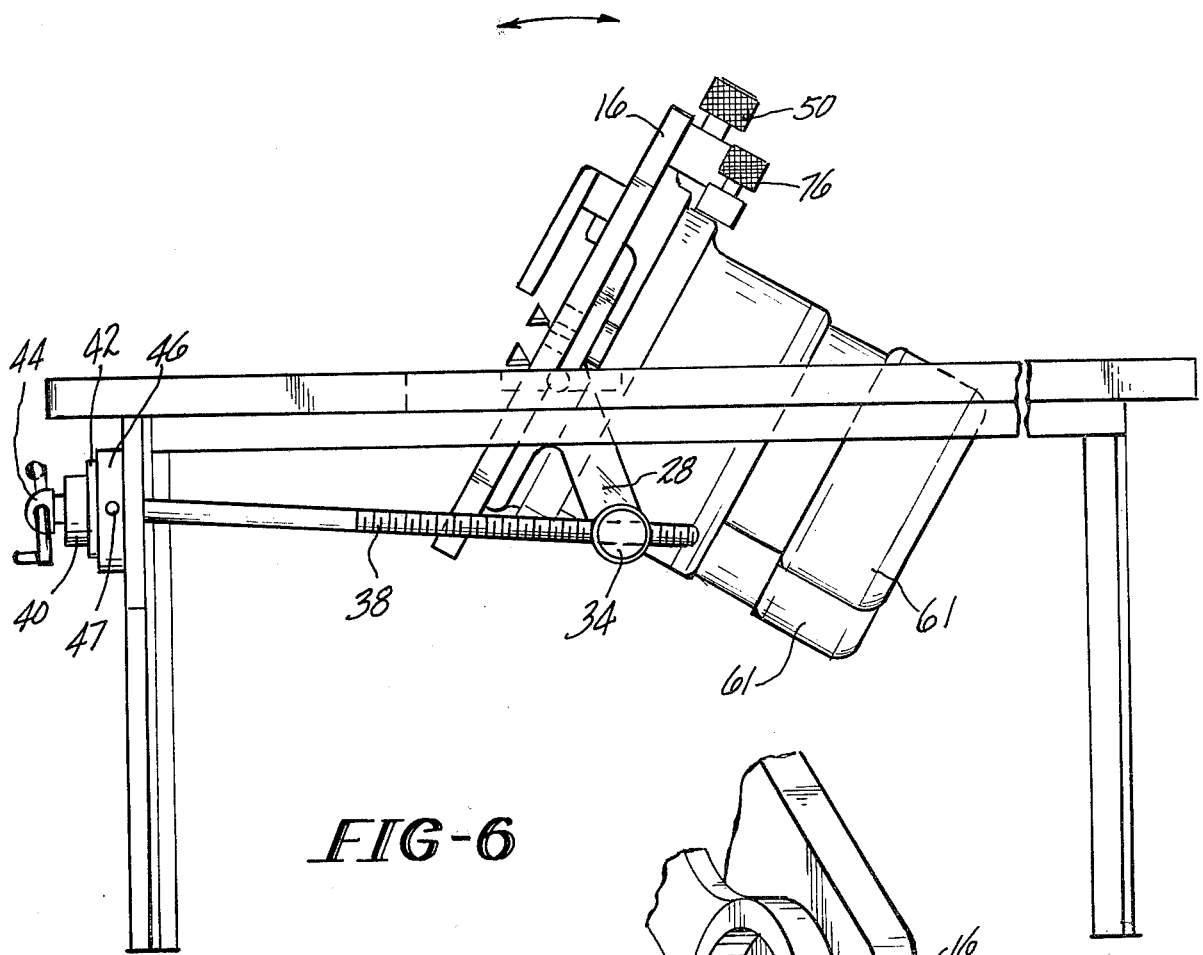
FIG. 6 is a side view of the preferred embodiment of the present invention.
Figure 8:
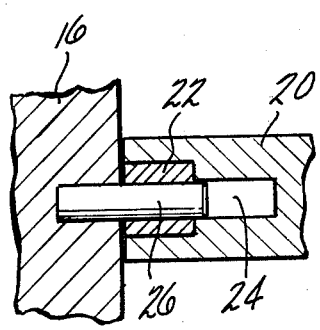
FIGS. 7 and 8 show the bracket on which the support plate is pivotably mounted.
Figure 7:
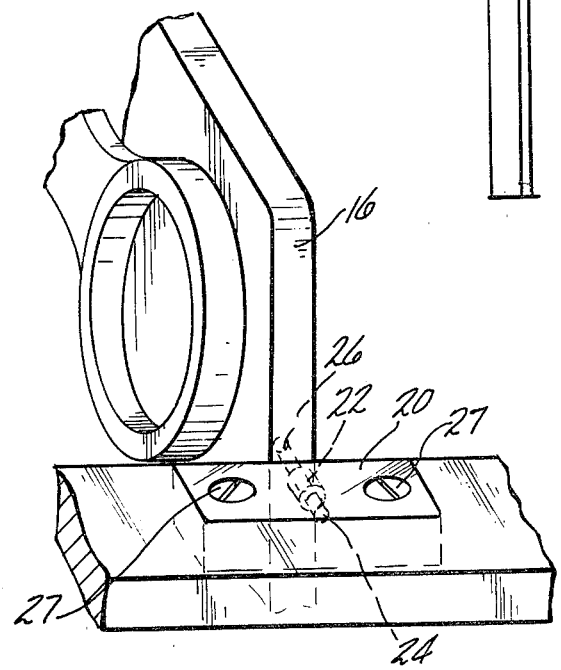

Referring to FIGS. 5 and 6, the drive mechanism for pivoting the support plate 16 will be described in detail. Secured to the back of the support plate 16 by means of bolts or the like in an h-shaped level 28 which is provided with a bore hole 30 on its short leg in which a ball bearing 32 is rotatably mounted. Secured to the ball bearing 32 and rotatable therewith is oilite bearing 34 which is provided with a threaded bore 36 in which a threaded rod 38 is received. The rod 38 has one end thereof rigidly secured to plate 40 which is adapted to rotate in the frame 42 by turning crank 44. The frame 42 is in turn pivotably mounted in housing 46 on pin 47 such that as the threaded rod 38 is screwed in and out of the oilite bearing 34 the frame 42 is allowed to pivot and bearing 34 allowed to rotate thereby preventing lock up. The rotary movement of the thread rod 38 is transferred to lateral movement of the h-shaped lever 28 and thus to pivotable movement of the support plate 16.

In accordance with the present invention, the back side of support plate 16 has secured thereto by means of bolts or the like the female portion 46 of a dovetail slide. The male portion 48 of the dovetail slide is received within the female portion 46 and is adapted to slide therein by means of a bolt 50 which is rotatably threadable in brackets 52 and 54, respectively. Upon turning the bolt 50 the male portion 48 of the dovetail slide may be reciprocated in the vertical direction within the female portion 46 of the dovetail slide. The male portion 48 of the dovetail slide has yoke member 58 pivotably mounted thereon by means of a bearing pin 56. The yoke member 58 is provided with a pair of spaced apart circular openings 60 which mate with corresponding openings 62 in the support plate 16. Mounted within the openings 60 on the yoke member 58 are a pair of cutting tools such as routers 61. The cutting tools are secured to the yoke member 58 by means of a plurality of brackets 64 of which only one is shown. The yoke member 58 is further provided with a plurality of clamping means 66 which fixedly secure the yoke to the support plate 16. The clamping means 66 when loosened allows the yoke to pivot about bearing pin 56 while the camped portions are free to move within cut outs 70 provided in support plate 16. When the yoke member 58 is pivoted to its desired position the clamping means 66 are tightened so as to secure the yoke member in place on the support plate.

In order to pivot the yoke member 58 the bracket 54 on male portion 48 of the dovetail slide is provided with a bracket 72 which has rotatably mounted thereon an extension 74 provided with an unthreaded bore 75 within which a threaded bolt 76 is free to rotate. The extension 74 is provided with a cylindrical portion 78 which is received within a bore 80 in the bracket 72. The cylindrical portion has a threaded bore 77 provided therein for receiving bolt means 82 which rotatably secures the extension 74 to the bracket 72. The yoke portion 58 is provided with an extension 84 similar to extension 74 and is rotatably mounted on the yoke member 58 in the same manner as previously described with reference to extension 74. The extension 84 is provided with a threaded bore 86 which is adapted to receive the threaded bolt 76 for pivoting the yoke 58 as the bolt 76 is threaded in and out of the extensions 74 and 84.

By way of the foregoing structure, the routers 61 may be moved in unison in the vertical direction by rotating bolt member 50 which in turn moves the male portion 48 of the dovetail slide in a vertical direction within the female portion 46. Likewise, the spacing between the cutting tools on the routers 61 may be varied by loosening clamp means 68 and clamp 88 and thereafter rotating bolt 76 so as to pivot the yoke member 58 on the pin 56. The provision of the yoke assembly is particularly useful as it allows for a wide adjustment of router positions while requiring a minimal vertical movement of the bolt 76.

The particular advantages of the apparatus of the present invention will be made readily apparent from the following example. For the sake of description, it is assumed that one is desirous of making a dovetail joint of uniform size in a plurality of workpieces. It is also necessary that the dovetail joint be made at various angles in some of the workpieces so as to form corner joints and the like. By way of the apparatus of the present invention all these cuts may be made after the initial positioning of the routers without the necessity of repositioning the routers relative to each other. Initially, the clamp means 68 and clamp 88 are loosened and the bolt 76 is threaded within the extensions 74 and 84 so as to pivot the yoke 58 about the pin 56. The yoke is pivoted the desired amount to effect the spacing between the cutting tools on the routers 61 which is equal to the desired thickness of the male portion of the dovetail joint. The size of the cutters on the routers 61 are equal to the desired width and configuration of the female portion of the dovetail joint. Once the cutters are spaced in their desired position the clamp means 68 and clamp 88 are tightened thereby securing the yoke member 58 to the support plate 16. With the support plate in its vertical position the routers 61 are now movable in unison by means of the bolt 50 which moves the male portion 48 of the dovetail slide within the female portion 46 so as to position the routers 61 relative to the surface of the table 12. In this manner the cutters on the routers 61 are positioned such that one cutter will cut on top of the workpiece and the other cutter will cut the bottom of the workpiece so as to form the male portion of the dovetail joint in a single pass of the workpiece through the cutters. Once the routers are positioned for the male cut by pivoting the yoke 58 about the bearing 56 all the cuts, both male and female and angle cuts, may be made without the necessity of moving the routers relative to each other. After all the male cuts have been made the routers may be moved in unison by means of the dovetail slide as previously described in a vertical direction so as to bring one of the cutters in position to make all the female cuts. If at a later time it is found that more male cuts are necessary, the routers may again simply be moved on the dovetail slide back to their initial position relative to the surface of the table. When it is required to make angle cuts, the support plate is simply pivoted by means of the drive mechanism previously described. In this manner accurate and tightly fitted dovetail joints are made without having to reposition the cutters relative to one another after they are initially positioned for making the male portion of the joint.

As previously noted, numerous other cuts may be accomplished by merely replacing the routers with other suitable tools.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within its spirit and scope as defined by the claims.

What is claimed is:

1. An apparatus for making both the male and female cuts of a joint on a wooden workpiece wherein said male cut is made in a single pass comprising:
   a stand;
   a support plate pivotably mounted on said stand;
   means for pivoting said support plate from a first position to a second position;
   a pair of cutting tools mounted on said pivotable support plate defining the center line of a cut to be made and movable thereon;
   first adjustment means for moving said cutting tools in unison while maintaining their same relative position; and
   second adjustment means for moving said cutting tools relative to each other while maintaining the same center line of cut.

2. An apparatus according to claim 1 wherein said pair of cutting tools are sequentially mounted on said support plate.

3. An apparatus according to claim 2 wherein a yoke assembly is pivotably and vertically mounted on said support plate and said pair of cutting tools are mounted on said yoke assembly.

4. An apparatus according to claim 3 wherein clamp means removably secure said yoke assembly to said support plate.

5. An apparatus according to claim 3 wherein said first adjustment means comprises a dovetail slide secured to said support plate and said yoke assembly is pivotably mounted on a portion of said dovetail slide.

6. An apparatus according to claim 5 wherein said second adjustment means comprises a first pivotable member secured to said yoke assembly, a second pivotable member secured to said dovetail slide and means rotatably in said first and second pivotable members for varying the distance between said first and second pivotable members.

7. An apparatus according to claim 1 wherein said means for pivoting said support plate comprises a rotatable crank pivotably mounted within a housing secured to said stand, said crank being provided with a threaded rod having a first end secured to said crank and a second end threadably received with a threaded bore on said support plate.

8. An apparatus according to claim 7 wherein said support plate includes an h-shaped lever secured thereto, said h-shaped lever is provided on the short leg thereof with a through bore in which a first bearing is rotatably mounted.

9. An apparatus according to claim 8 wherein a second bearing is secured to and rotatable with said first bearing, said second bearing being provided with said threaded bore.

10. An apparatus according to claim 1 wherein said second adjustment means moves said cutting tools in unison.

11. An apparatus for cutting a wooden workpiece comprising:
    a pivotable support plate;
    a pair of cutting tools mounted on said pivotable support plate defining the center line of a cut to be made;

first adjustment means for moving said cutting tools in unison while maintaining the same relative position therebetween;

second adjustment means for moving said cutting tools relative to each other while maintaining the same center line of cut; and means for pivoting said support plate.

12. An apparatus according to claim 11 wherein said pair of cutting tools are sequentially mounted on said support plate.

13. An apparatus according to claim 12 wherein a yoke assembly is pivotably and vertically mounted on said support plate and said piar of cutting tools are mounted on said yoke assembly.

14. An apparatus according to claim 13 wherein said first adjustment means comprises a dovetail slide secured to said support plate and said yoke assembly is pivotably mounted on a portion of said dovetail slide.

15. An apparatus according to claim 14 wherein said second adjustment means comprises a first pivotable member secured to said yoke assembly, a second pivotable member secured to said dovetail slide and means rotatably in said first and second pivotable members for varying the distance between said first and second pivotable members.

16. An apparatus according to claim 11 wherein said second adjustment means moves said cutting tools in unison.

17. A method for making both the male and female cuts of a joint on a wooden workpiece wherein the male cut is made in a single pass comprising:

providing a first cutting tool and a second cutting tool wherein said cutting tool dimension is equal to the dimension of the female cut;

positioning said first cutting tool at a spaced distance from said second cutting tool which is equal to the dimension of the male cut;

positioning said first cutting tool and said second cutting tool in unison about the desired cut axis of said workpiece while maintaining the same relative position therebetween;

feeding a workpiece to said first cutting tool and said second cutting tool wherein one tool cuts the top of said workpiece and the other tool cuts the bottom of said workpiece to form the male portion of said joint;

positioning said first and second cutting tools in unison while maintaining the same relative position therebetween such that one of said cutting tools is positioned to make said female cut; and feeding a workpiece to said one cutting tool wherein said female cut is made.

18. A method according to claim 17 further including the step of pivoting said cutting tools in unison.

* * * * *